No. 642,712. Patented Feb. 6, 1900.
J. PARKER.
HIGH SPEED ATTACHMENT FOR MILLING MACHINES.
(Application filed Aug. 2, 1899.)

(No Model.)

WITNESSES,

Ira L. Fish
R. A. Bates

INVENTOR,

John Parker,
BY Wilmarth H. Thurston,
ATT'Y.

UNITED STATES PATENT OFFICE.

JOHN PARKER, OF PROVIDENCE, RHODE ISLAND, ASSIGNOR TO THE BROWN & SHARPE MANUFACTURING COMPANY, OF SAME PLACE.

HIGH-SPEED ATTACHMENT FOR MILLING-MACHINES.

SPECIFICATION forming part of Letters Patent No. 642,712, dated February 6, 1900.

Application filed August 2, 1899. Serial No. 725,883. (No model.)

*To all whom it may concern:*

Be it known that I, JOHN PARKER, of the city and county of Providence and State of Rhode Island, have invented certain new and useful Improvements in High-Speed Attachments for Milling-Machines; and I do hereby declare the following specification, taken in connection with the accompanying drawings, forming a part of the same, to be a full, clear, and exact description thereof.

In the usual form of milling-machines the tool or milling-cutter is carried by a spindle which is driven by a belt running on one of the steps of a cone-pulley secured to the spindle or connected therewith by gearing, the speed of the spindle being varied by shifting the belt onto different steps of the pulley. The range of variation in the speed of the spindle is not very wide in this construction, and it is frequently desirable to use a cutter driven at a higher rate of speed than the highest speed of the spindle. This has usually been done by mounting a supplemental spindle in the socket of the main spindle and driving said supplemental spindle by belting from overhead or by a system of belting from the spindle-driving cone.

The present invention relates to a high-speed attachment, and has for its object to provide an attachment which may be more readily applied and removed and which is more simple and efficient in action than the attachments heretofore used for this purpose.

To that end the invention comprises a support for a supplemental spindle which may be secured to any convenient part of the machine and gearing connecting the supplemental and main spindle. The support for the supplemental spindle is preferably secured to the face of the bearing for the main spindle and preferably consists of a cap-shaped casing which incloses the end of the main spindle and the gearing connecting the spindles. This casing is preferably secured to the spindle-block by a series of bolts, and it may be readily and conveniently secured in position or removed. The gearing between the spindles preferably consists of an internal gear secured to the end of the main spindle, which meshes with a pinion secured to the end of the supplemental spindle. With this construction a very simple form of gearing is provided, by which the supplemental spindle is driven in the same direction that the main spindle revolves.

The invention consists in the features and combinations hereinafter set forth in the claims.

Figure 1:
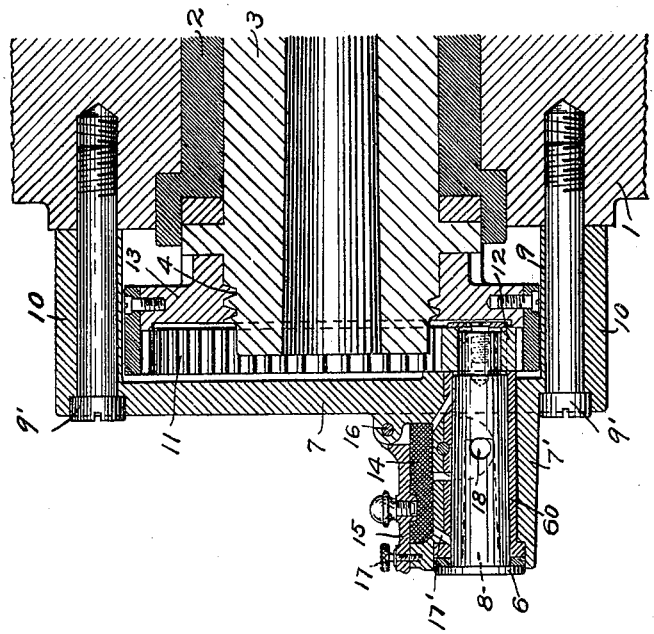
Figure 2:
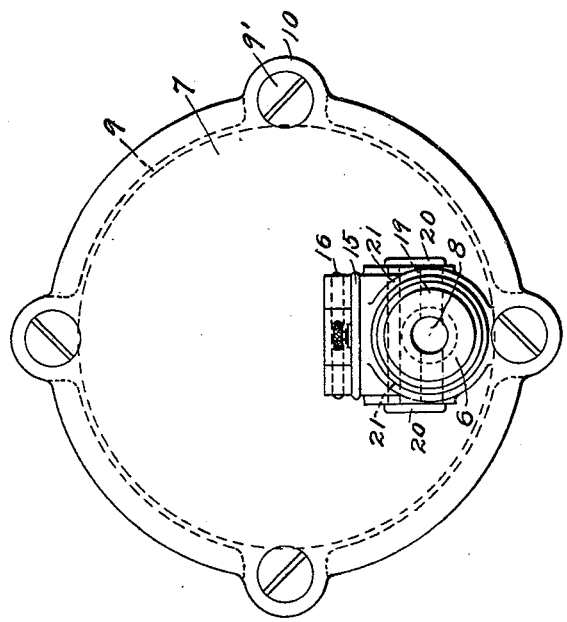

In the drawings, Figure 1 is a sectional view of so much of an attachment embodying all the features of the present invention in their preferred forms and so much of a milling-machine as is necessary to show the means of applying said attachment, and Fig. 2 is a front elevation of the same.

Referring to the drawings in detail, 1 represents the bearing-block, in which the front bearing 2 of the spindle 3 is mounted. The spindle is driven in any well-known manner, as by a cone-pulley secured thereon or geared thereto, and is provided with the usual screw-thread 4 at its front end. The high-speed or supplemental spindle 6 is mounted in a bearing-bushing 60, which is in turn mounted in boss 7', forming part of a support 7. The spindle 6 is provided with a tapered bore 8 at its front end for receiving the shank of a milling tool or cutter. The support for the supplemental spindle may be of any suitable form and may be secured in place in any suitable manner; but it is preferred to construct said support in the form of a cap-shaped casing having an annular rim 9, which surrounds the spindle 3 and bears against the front face of the block 1. The casing is preferably held in place by a series of bolts 9', which pass through ears 10 on the casing and engage screw-threaded holes in the block 1. The spindle 6 is driven from the spindle 3 by means of gearing located within and protected by the casing 7, which in the form shown consists of an internal gear 11, secured to the end of spindle 3 and engaging a pinion 12, secured to the end of spindle 6. Other forms of gearing may be used for connecting the spindles without departing from certain features of the invention; but this form is preferred owing to its simplicity and compactness. Moreover, it is desirable that the spindle 6 should revolve in the same direction with spindle 3, since milling-cutters are usually constructed to cut when running right-handed, and should spindle 6 run in the opposite direction specially-constructed cutters would have to be used therewith. The gearing shown accomplishes this desirable end in a very simple manner. The gear 11 is preferably secured to the spindle 3 by means of an internally-screw-threaded hub 13, which is screwed onto the end of the spindle and by which the gear may be readily and quickly attached or detached.

An oil-chamber 14 is provided in the support 7, which may be filled with wool or other absorbent material, if desired, and which is protected by a cover 15, hinged at 16 and held closed by a screw 17. Passages 17' lead from the chamber 14 to the bearing 60.

In order to remove the tool or cutter from the spindle 6, a hole 18 is formed through said spindle, which passes transversely through the bottom of the bore 8. When it is desired to remove a cutter, this hole is brought into register with a hole 19, which passes through the boss 7', and a tapered rod is inserted which bears against the end of the cutter-shank and forces the cutter out. The ends of the hole 19 are normally closed by covers 20, which are secured to the ends of a rod 21, so that when one cover is turned to open or close the hole 19 the other cover moves with it.

When the attachment is to be used, the gear 13 is first secured to the spindle 3 and then the casing 7 is placed over the end of the spindle 3 and secured by the bolts 9'. Since the spindle 6 is driven from the spindle 3, the speed of spindle 6 may be varied by shifting the belt on the spindle-driving cone. When the machine is to be used without the attachment, said attachment may be quickly and conveniently removed.

What I claim as my invention, and desire to secure by Letters Patent, is—

1. A high-speed attachment for a milling-machine consisting of a supplemental spindle, a support therefor and gearing for connecting said spindle and the main spindle of the milling-machine, substantially as described.

2. A high-speed attachment for a milling-machine consisting of an internal gear secured to the end of the main spindle, a removable support, a spindle mounted in said support, and a pinion on the end of said spindle meshing with said internal gear, substantially as described.

3. A high-speed attachment for milling-machines consisting of a removable support, a spindle mounted therein, a gear provided with a screw-threaded hub for engaging the screw-thread on the spindle of a milling-machine, and gearing connecting said gear and said spindle.

4. A high-speed attachment for milling-machines consisting of a casing for inclosing the end of the main spindle, a spindle mounted in said casing, and means within said casing for driving said spindle from the main spindle, substantially as described.

5. A high-speed attachment for milling-machines consisting of a casing for inclosing the end of the main spindle, a spindle mounted in said casing, and gearing between said spindle and the end of the main spindle, substantially as described.

6. A high-speed attachment for milling-machines consisting of a casing for inclosing the end of the main spindle, a supplemental spindle mounted therein, an internal gear secured to the end of the main spindle, and a pinion on the end of the supplemental spindle engaging said internal gear, substantially as described.

7. A high-speed attachment for milling-machines, consisting of a casing having an annular rim for inclosing the end of the main spindle, bolts for securing said casing in place, a supplemental spindle mounted in said casing and gearing within said casing for driving the supplemental spindle from the main spindle, substantially as described.

8. A high-speed attachment for milling-machines consisting of a casing 7, a spindle 6 mounted therein, a pinion on the end of spindle 6, and internal gear 11 provided with a screw-threaded hub for engaging the screw-thread on the spindle of a milling-machine, substantially as described.

9. The combination with a spindle provided with a tapered bore and a transverse hole as 18 passing across said bore, a boss as 7' having a registering hole as 19, covers as 20 for the ends of hole 19, and a rod as 21 to which both of said covers are secured, substantially as described.

JOHN PARKER.

Witnesses:
 H. R. McGREGOR,
 IRA L. FISH.